(12) United States Patent
Falkenå et al.

(10) Patent No.: US 7,912,042 B2
(45) Date of Patent: Mar. 22, 2011

(54) IMS SURROGATE REGISTRATION (75) Inventors: Jonas Falkenå, Huddinge (SE); Per Roos, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 12/444,937

(22) PCT Filed: Oct. 11, 2006

(86) PCT No.: PCT/SE2006/001150
§ 371 (c)(1),
(2), (4) Date: Apr. 9, 2009

(87) PCT Pub. No.: WO2008/044969
PCT Pub. Date: Apr. 17, 2008

(65) Prior Publication Data
US 2010/0098056 A1    Apr. 22, 2010

(51) Int. Cl.
*H04L 12/66* (2006.01)
(52) U.S. Cl. ........ 370/352; 370/357; 370/354; 370/328; 709/229
(58) Field of Classification Search ............ 709/229
See application file for complete search history.

(56) References Cited

U.S. PATENT DOCUMENTS

2005/0083909 A1* 4/2005 Kuusinen et al. ............ 370/352
2006/0218291 A1* 9/2006 Zhu et al. .................... 709/229

OTHER PUBLICATIONS

3GPP TSG SA WGZ Architecture—S2#54; S2-062882, "CSI Interworking for IMS unregistered CSI capable UE", Aug. 28-Sep. 1, 2006. Sophia Antipolis, France, retrieved from the Internet: http://www.3gpp.org/ftp/tsg_sa/WG2_Arch/TSGS2_54_Sophia_Antipolis/Docs/, the whole document.
3GPP TSG SA WG2 Architecture—S2#54; S2-063026; "CSI capability indication". Aug. 28-Sep. 1, 2006, Sophia Antipolis, France, retrieved from the Internet: http://www.3gpp.org/ftp/tsg-sa/WG2-Arch/TSGS2_54_Sophia_Antipolis/Docs/, the whole document.
3GPP TSG SA WG2 #49; S2-052518; CSI interworking with pure IMS UE; Nov. 7-11, 2005.

* cited by examiner

*Primary Examiner* — Duc C Ho (57) ABSTRACT

A method and arrangement in a telecommunication system for facilitating communication between a first terminal A configured to use a first session model and a second terminal B configured to use a second session model for media transportation. A first feature tag representing a contact between the first terminal A and the second terminal B is registered in a control domain in the system. When setup of a first voice media session between the first terminal A and the second terminal B is initiated, the registered first feature tag is detected and the first media session is detected and the first media session is routed via a circuit-switched domain.

19 Claims, 7 Drawing Sheets

PRIOR ART

IMS SURROGATE REGISTRATION

TECHNICAL FIELD

The present invention relates to methods and arrangements in a telecommunication system to facilitate communication between a first terminal configured to use a first session model for media transportation, and a second terminal configured to use a second session model for the media transportation.

BACKGROUND

IP Multimedia Subsystem IMS is the technology defined by the Third Generation Partnership Project 3GPP to provide IP Multimedia services over mobile communication networks (3GPP TS 22.228, TS 23.228, TS 24.229, TS 29.228, TS 29.229, TS 29.328 and TS 29.329 Release 5 and Release 6). IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS makes use of the Session Initiation Protocol SIP to set up and control calls or sessions between user terminals (or user terminals and application servers). The Session Description Protocol SDP, carried by SIP signaling, is used to describe and negotiate the media components of the session. Whilst SIP was created as a user-to-user protocol, IMS allows operators and service providers to control user access to services and to charge users accordingly.

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalized, rich multimedia communication services, including so-called "combinational IP Multimedia" services.

The concept behind combinational services involves bundling the voice service in an existing circuit-switched CS domain with the "content" in the packet-switched PS domain. It uses standards-based voice and data networks that are, to a great extent, already in use by operators. An example of combinational services is when a voice call is setup as normal in the CS domain and then while the call is ongoing, content such as images, videos and files can be added or dropped via the PS domain. It enriches voice communication and improves the interaction between voice and data services creating a number of new business opportunities for mobile operators. The combinational services end-to-end solution is highly scalable, robust and aligned with the 3GPP Combining CS and IMS services CSI specifications and is based on IMS architecture as specified by 3GPP.

Figure 1:
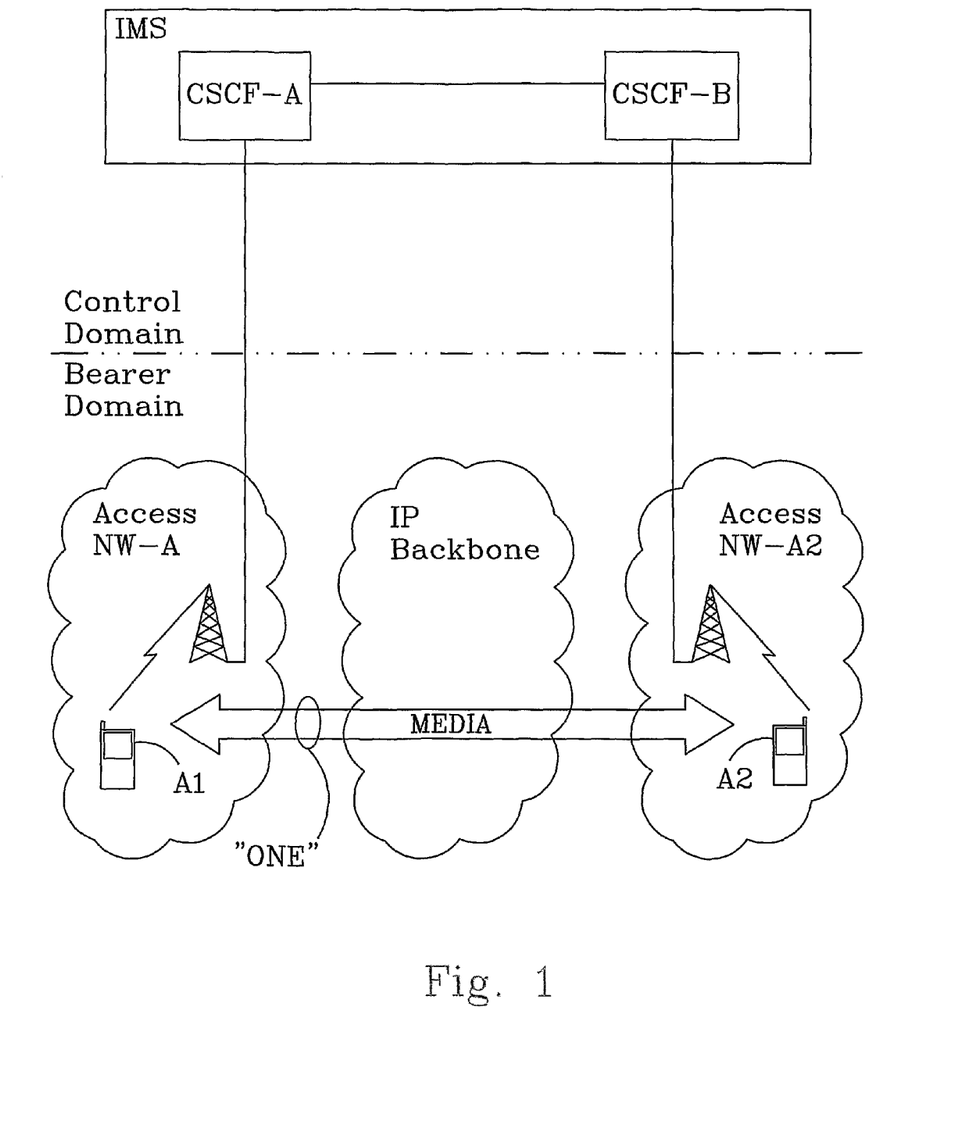
FIG. 1 is part of prior art and discloses a block schematic illustration of IP Multimedia subsystem in conjunction with access networks and backbone network when media is transferred according to a one-session model.

Fixed IMS deployments support a variety of services like IMS Multimedia Telephony MMtel, File Transfer and Instant Messaging etc. IMS Multimedia Telephony offers new, attractive services for the residential market. Operators can expand their current Public Switched Telephone Network PSTN offering with one or several IP-telephony lines to each household. IMS Multimedia Telephony is based on IMS standard, specified by 3GPP. Furthermore the solution is built according to a standardization conducted by TISPAN that handles additional requirements from fixed network perspective. IMS Multimedia Telephony reduces costs by allowing seamless adding of new applications and evolution of services from IP Telephony to Video telephony to fixed/mobile convergence. In IMS Multimedia Telephony, a single session model is used for multiple media transportation, e.g. voice and video is negotiated and setup as one signaling session. FIG. 1 is part of the prior art and schematically discloses communication between Multimedia Telephony terminals A1 and A2 both using media transfer according to a one-session model "ONE". The further node entities shown in FIG. 1 will be explained later in the description when the invention is discussed.

Currently CSI (Combining CS and IMS services) is a 3GPP defined service used to enrich the experience of a normal mobile circuit switched CS communication session such as voice with a simultaneous IMS session. This IMS session could be a video stream, picture transfer or other types of media transfer.

While in IMS Multimedia Telephony MMtel, voice and video is negotiated and setup as one signaling session, in the case of CSI, voice is setup with a CS session and e.g. video is setup with an IMS session in parallel i.e. MMtel uses a one session model and CSI uses a two session model. Communication between terminals using different session models poses an interworking problem.

In the US Patent Application US 2006/0126590 is disclosed a method for receiving data in a system where data is transmitted on a plurality of frequencies. A device determines a configuration associated with a selected session and receives the session in accordance with a determined configuration. In a CSI to MMtel scenario the mismatch concerns a one-way session in relation to a two-way session where the second session could result in a busy response from the MMtel client.

A further problem is the necessity to do session re-routing. The US Patent Application US 2004/0160895 A1 discloses a failure notification followed by an appropriate re-routing.

A voice session initiation from MMtel to CSI will result in routing into the Packet Switched domain followed by a rejection from CSI, since CSI does not support Voice over Packet Switch, only Voice over Circuit Switch. MMtel uses the IMS domain for setup according to the one-session model while CSI uses both IMS and CS domains for setup according to the two-session model. Caller Preferences for the Session Initiation Protocol can be found in standard documents such as RFC 3841.

SUMMARY

The present invention relates to the inability for an IMS Core network to do Circuit Switch breakout for a session aimed at a registered user. Breakout only occurs if the called subscribed is not registered within the system. In this case the subscriber is registered in the system but due to the communication incapability between a one-session-model terminal (such as MMtel) and a two-session-model terminal (such as CSI), no indication will be found in the IMS Control domain during session setup showing the necessity to perform routing in Circuit Switch domain for the two terminals to be able to communicate. A further problem is related to communication between terminals using different session models. For a one-session-model terminal to be able to communicate with a two-session-model terminal, one session has to be split into two sessions or two sessions have to be merged into one. For example, in a CSI to MMtel scenario, if this is not done the second session could result in a busy or error response from the MMtel client. Splitting or merging sessions however implies obstacles due to the inherent differences of the session types.

The routing problem is solved by performing a surrogate registration in the control domain in the telecommunication system. The surrogate registration enables routing into Circuit Switch domain.

The solution more in detail comprises a method to facilitate communication between a first terminal configured to use a first session model, and a second terminal configured to use a second session model for media transportation. The method comprises the following steps:

Register a first feature tag in a control domain in the system, representing a contact between the first terminal and the second terminal.
Initiate set up of a first media session between the terminals.
Detection of the registered first tag.
Routing the first media session via a circuit switch domain.

According to a further aspect of the invention, communication problems are solved by facilitating for the one-session terminal circumstantially to select to communicate either according to a one-session-model or according to a two-session-model. Fetching registration data related to a terminating user permits the "one-session" user to select what model type to use, i.e. in dependence of what model type the other user supports.

An object of the invention is to enhance the ability for IMS/SIP clients such as an MMtel client to make enhanced voice calls to IMS/CS combined clients such as a CSI terminal. This object and others are achieved by methods, arrangement, systems and articles for manufacture.

An advantage with the invention is that it carries out a way to support interworking between fixed IMS/SIP one-session terminals and CSI two-session terminals.

Another advantage with the invention is that it introduces a surrogate registration function to enable the use of IMS functionality in the context of CSI interworking.

The invention will now be described more in detail with the aid of preferred embodiments in connection with the enclosed drawings.

DETAILED DESCRIPTION

Figure 2:
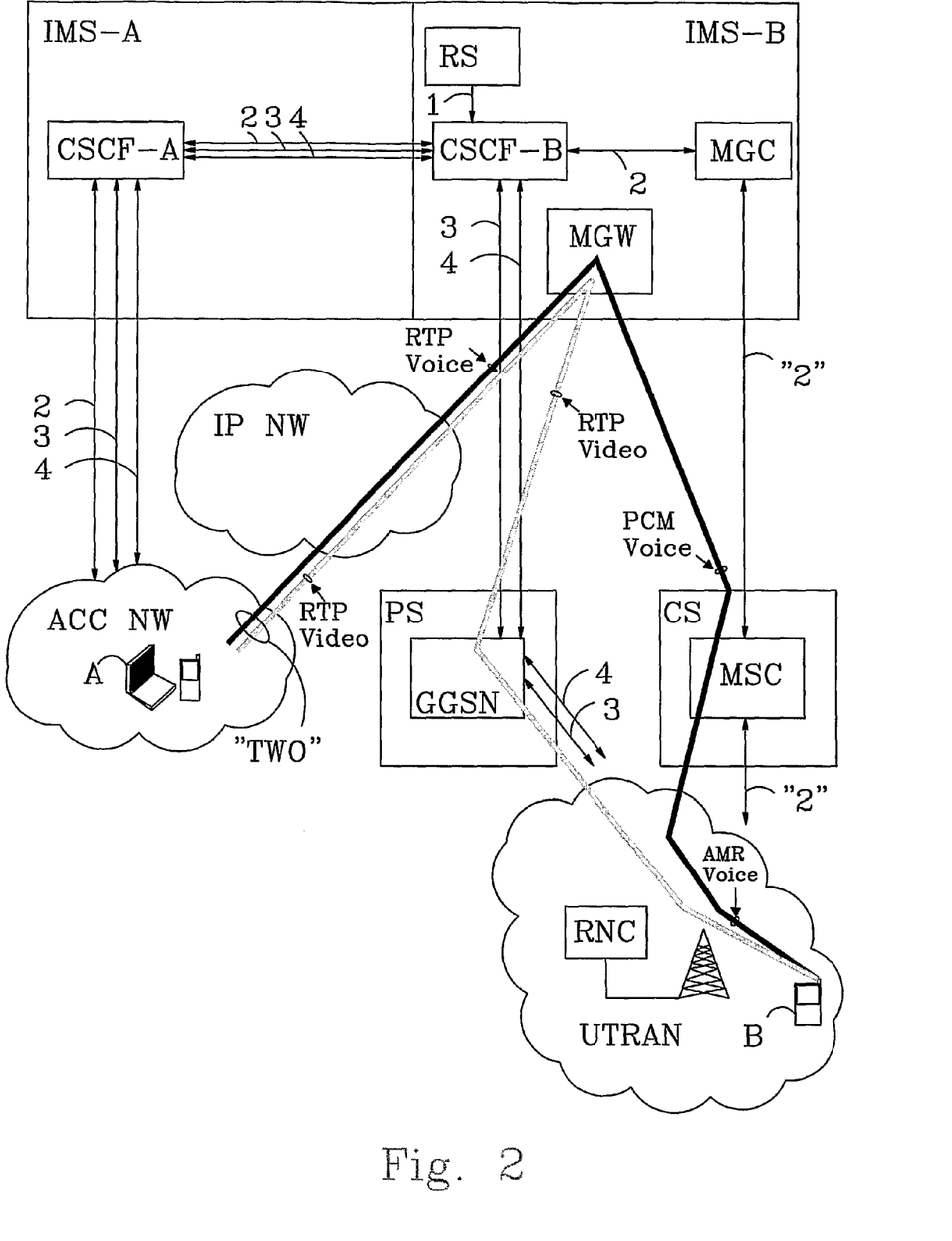
FIG. 2 discloses a block schematic illustration of IP Multimedia subsystem in conjunction with access networks and backbone network when media is transferred between a reconfigured MMtel terminal and a CSI terminal according to a two-session model. Voice and Video is initiated from the MMtel terminal.

FIG. 2 discloses a telecommunication system comprising an IP Multimedia Subsystem IMS-A and IMS-B that handles signaling in a control domain. Media such as voice and video is mainly handled in a bearer domain. The bearer domain in the example consists of an access network ACC NW (such as PLMN and PSTN) and an UMTS Terrestrial Radio Access Networks UTRAN and a backbone network IP NW. An MMtel client A is located in the access network ACC NW while a CSI client B is located in the access network UTRAN. The MMtel client A is a one-session client used for multiple media. Voice and video for example is negotiated and setup as one signaling session. The CSI client is a two-session client that communicates signaling and media to/from the IP Multimedia Subsystem IMS via a radio base station and a Radio Network Controller RNC. The signaling/media hereby pass a Mobile Service Switching Centre MSC in Circuit-Switched CS domain or a Gateway GPRS Support Node GGSN in Packet-Switched PS domain. The control domain in the example comprises two IMS networks, an originating network IMS-A, and a terminating network IMS-B. In FIG. 2 each IMS network comprises a Call/Session Control Function CSCF-A and CSCF-B. The CSCFs are SIP servers and essential nodes in the IMS. A CSCF processes SIP signaling in the IMS network. The CSCF comprises different Call/Session Control Function types such as P-/I-/S-CSCF as defined in the standards but is for the sake of clarity shown in the schematic FIG. 2 as a single node. The P-CSCF acts among others as first point of contact (in the signaling plane) between a terminal and the IMS network, the S-CSCF is a central node of the signaling plane and performs session control. A Media Gateway Controller MGC receives the SIP signaling from the CSCF-B and transform the SIP signaling into ISDN User Part ISUP signaling. ISUP is used in Circuit Switched domain in the setting up, management, and release of trunks that carry voice and data between calling and called parties. A Registration Surrogate RS node registers a contact in CSCF-B. This contact contains information needed for the CSCF-B to route a request correctly. The RS is a SIP User Agent Client that performs a surrogate registration on behalf of a device such as a Circuit Switch device that can not register explicitly with the CSCF-B.

Figure 3:
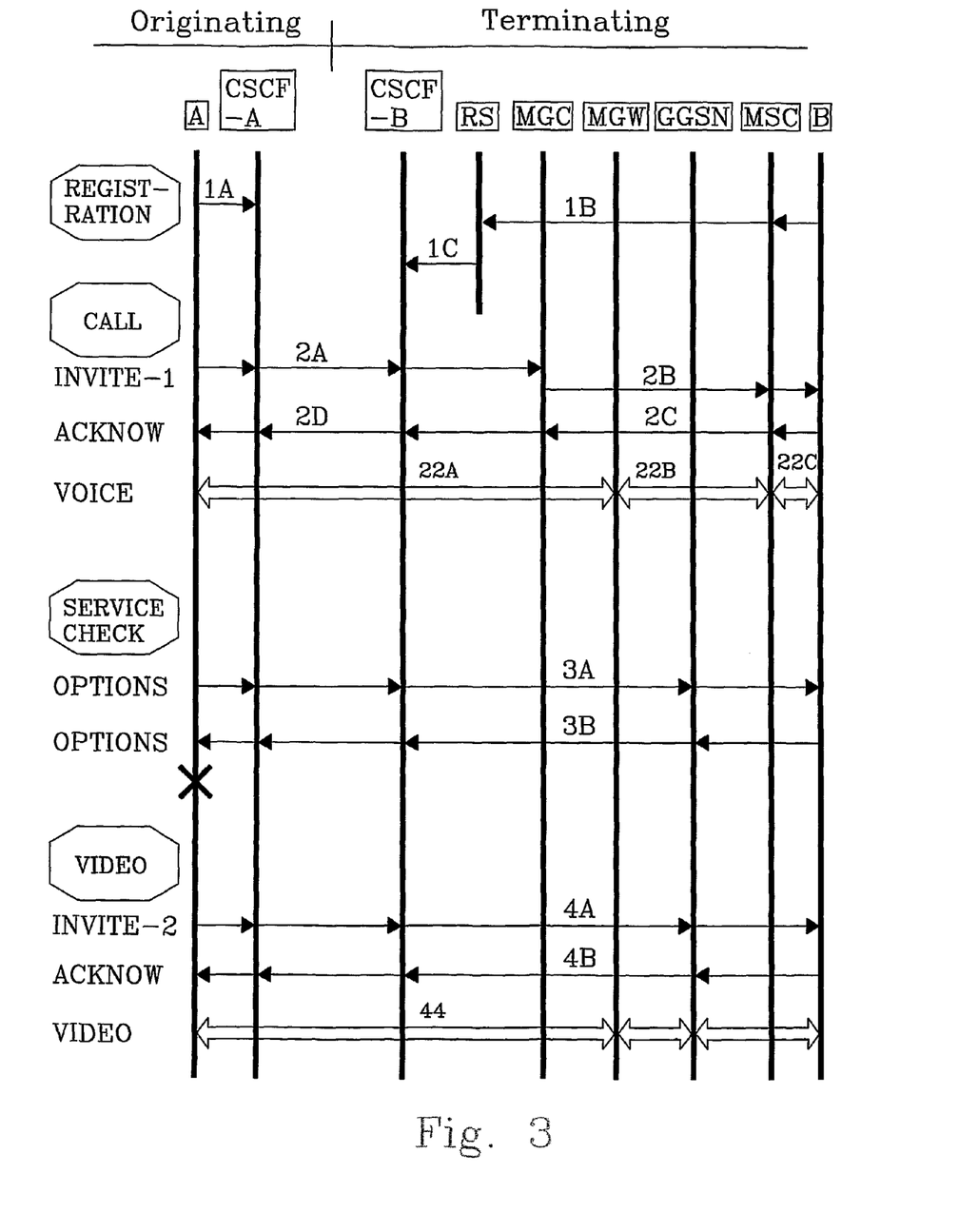
FIG. 3 discloses a signal sequence diagram for voice call setup from MMtel to CSI followed by video initiation from MMtel.

A first embodiment of the invention will now be introduced with FIG. 3. The method disclosed in FIG. 3 comprises voice call setup from A to B followed by A initiating video setup. The method will show a registration control that clarifies to the originating A client what session model the terminating B client uses i.e. a two-session model in this example. The method will also show routing of signaling into the CS domain and setup of a voice/video in parallel in a two-session communication. A prerequisite in this embodiment is that the one-session A client is prepared to reconfigure to use also the two-session model and consequently explicitly has registered contact for both CSI and MMtel in CSCF-A FIG. 3 is divided into four signaling groups i.e. REGISTRATION, CALL, SERVICE CHECK and VIDEO. The node entities such as CSCF, RS, etc. have already been explained in FIG. 2. The method according to the first embodiment of the invention comprises the following steps:

Registration
A contact Tag=CSI&MMtel, a so called second feature tag, is stored in the CSCF-A as part of registration data for the A client. The contact is sent 1A from A to CSCF-A. The contact contains information needed for the CSCF-A to route any MMtel or CSI request to the A client.
The B client, i.e. the CSI client, attaches the Circuit Switched CS network and a signal 1B is sent via the MSC from B to the Registration Surrogate node RS.

The RS registers the A client, i.e. the MMtel client which is configurable to communicate using either the one- or two-session model. The registration is shown in the figure with a signal 1C. A contact Tag=MMtel, a so called first feature tag, is hereby stored in the CSCF-B as part of registration data for the B client. The registration can occur either dynamically, as in the step above, or statically, i.e. at provision. If dynamic registration is wanted this could be implemented using CAMEL triggers or OSA/Parlay/Parlay X Status Services. By static registration, the registration is set manually in the RS. The RS then e.g. periodically updates the CSCF-B. The contact contains information needed for the CSCF-B to route any MMtel request to the B device via the MGC and MSC in Circuit Switched domain.

Call

The A client initiates an MMtel voice session from the originating client A towards the terminating client B via CSCF-B, by sending a SIP INVITE request 2A. The CSCF-B finds the MMtel contact, i.e. the Tag=MMtel, for the mobile CSI device and routes the SIP signaling request 2A accordingly to the MGC. The MGC is a state machine that does protocol conversion and in this example the MGC maps SIP to ISUP. The MGC forwards the ISUP signaling request 2B in Circuit Switched domain via the MSC to the B client.

The B client responds with an acknowledgement by sending an acknowledge signal 2C via the MSC to the MGC. After conversion of 2C, a SIP 200 (OK) response signal 2D is sent from the MGC to the A client in accordance with FIG. 3.

A voice session is now established between the clients. The session consists of Real-Time Protocol RTP Voice 22A between the A client and the Media Gateway MGW, Pulse Code Modulation PCM Voice 22B between the MGW and the MSC and of Adaptive Multi Rate AMR Voice 22C between the MSC and the B client.

Service Check

A service capability check is performed using a SIP OPTIONS signal 3A sent from the A client via the Gateway GPRS Support Node GGSN in Packet Switched PS domain to the B client.

The B client responds by sending a SIP OPTIONS signal 3B to the A client in accordance with FIG. 3. The SIP OPTIONS signal comprises a registration "CSI" showing that the B client supports CSI. In this case the remote B client only supports CSI, hence the originating A client knows to use the two session model for any additional media.

The A device is re-configured and is now prepared for usage of the second session model TWO. The reconfiguration is X-marked in FIG. 2. A prerequisite for the re-configuration is that the device is prepared to respond to the SIP OPTION signal above by the re-configuration. Same kind of signaling as above is sent in opposite directions. During this signaling the B client asks the A client what signaling the A client supports and A answers. (this signaling is not shown in FIG. 3)

Video

The A client initiates a CSI Video session towards the B client by sending a SIP INVITE request 4A according to FIG. 3. The B client responds by sending a SIP 200 (OK) signal 4B to A.

A two-way video session is now established between the clients. The session consists of Real-Time Protocol RTP Video 44 between the clients A and B.

Initiation of the video session might as well come from the B client. To be noted is also that FIG. 3 only shows the general principles of the signaling. Of course the signaling will vary depending on the existing circumstances such as for example if IMS-A or IMS-B are acting as home or visited networks for the subscribers A and B respectively. Furthermore, the protocol type of the signaling is only mentioned briefly but can be found in standard related documents. To be noted is also that the tags (CSI and MMtel) mentioned above are to be seen as examples. Any feature tag could be used.

Figure 4:
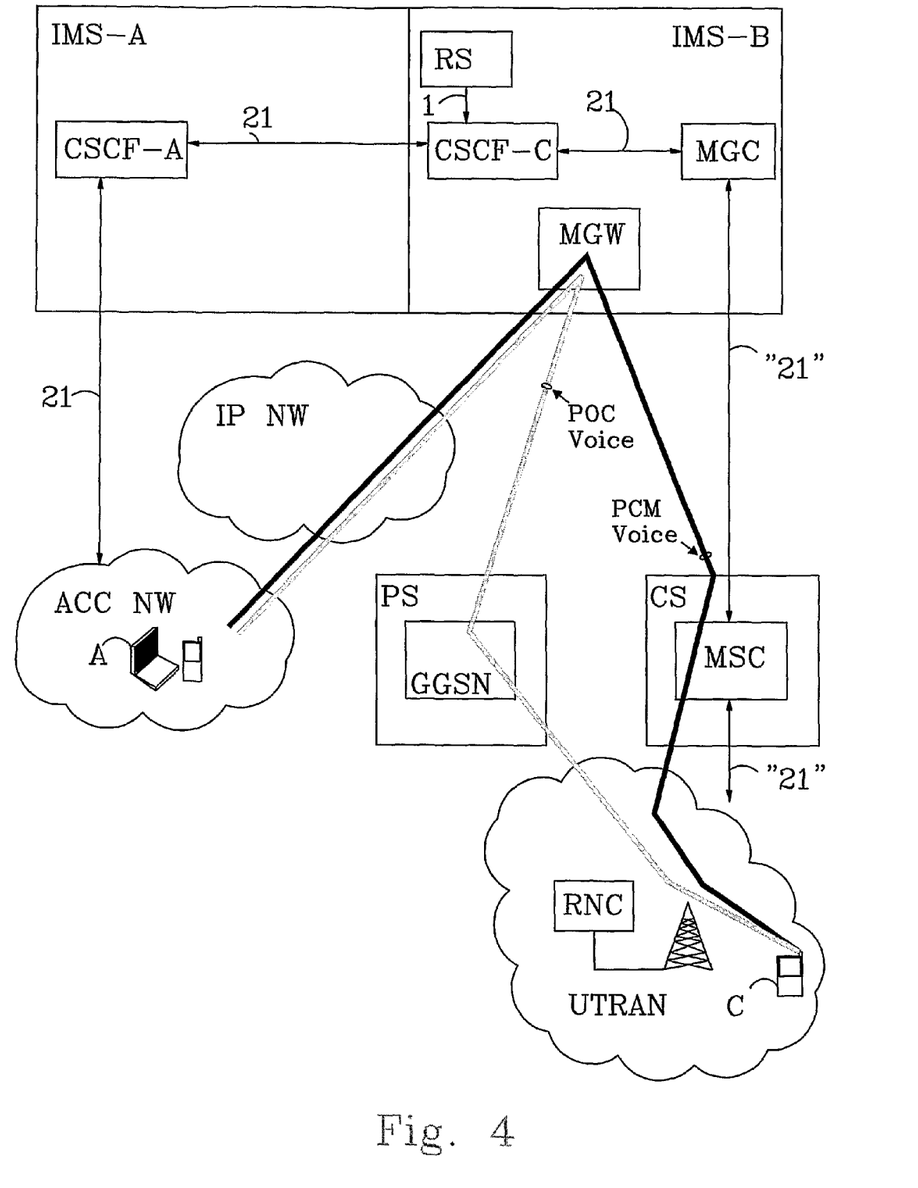
FIG. 4 discloses a block schematic illustration of IP Multimedia subsystem in conjunction with access networks and backbone network when media is transferred between an MMtel terminal and a PoC terminal.

FIG. 4 discloses a second embodiment of the invention. FIG. 4 corresponds in general to the already explained FIG. 2. However, in FIG. 4 the CSI device (the B device) has been replaced with a Push-to-talk over Cellular PoC device C. In PoC, mobiles are used in a walkie-talkie-like fashion e.g. one-to-one and one-to-many communication, where one user (in a group) can talk at a time. Like in the first embodiment, the A device is an MMTel device while C is a CS and POC device. The PoC device C uses the Circuit Switched CS domain for voice communication in real-time. For PoC the Packet Switched PS domain is used for "walkie-talkie" media communication i.e. not real-time communication. The A and C devices are configured to be able to communicate with each other using only one session at a time i.e. the first session is used for normal Voice communication while the second session is used for walkie-talkie communication. In this embodiment the A device do not need to be reconfigured to be able to use a two-session model like in the first embodiment. Still, since the C device is registered for POC a surrogate registration will be needed for routing MMTel sessions into CS domain.

Figure 5:
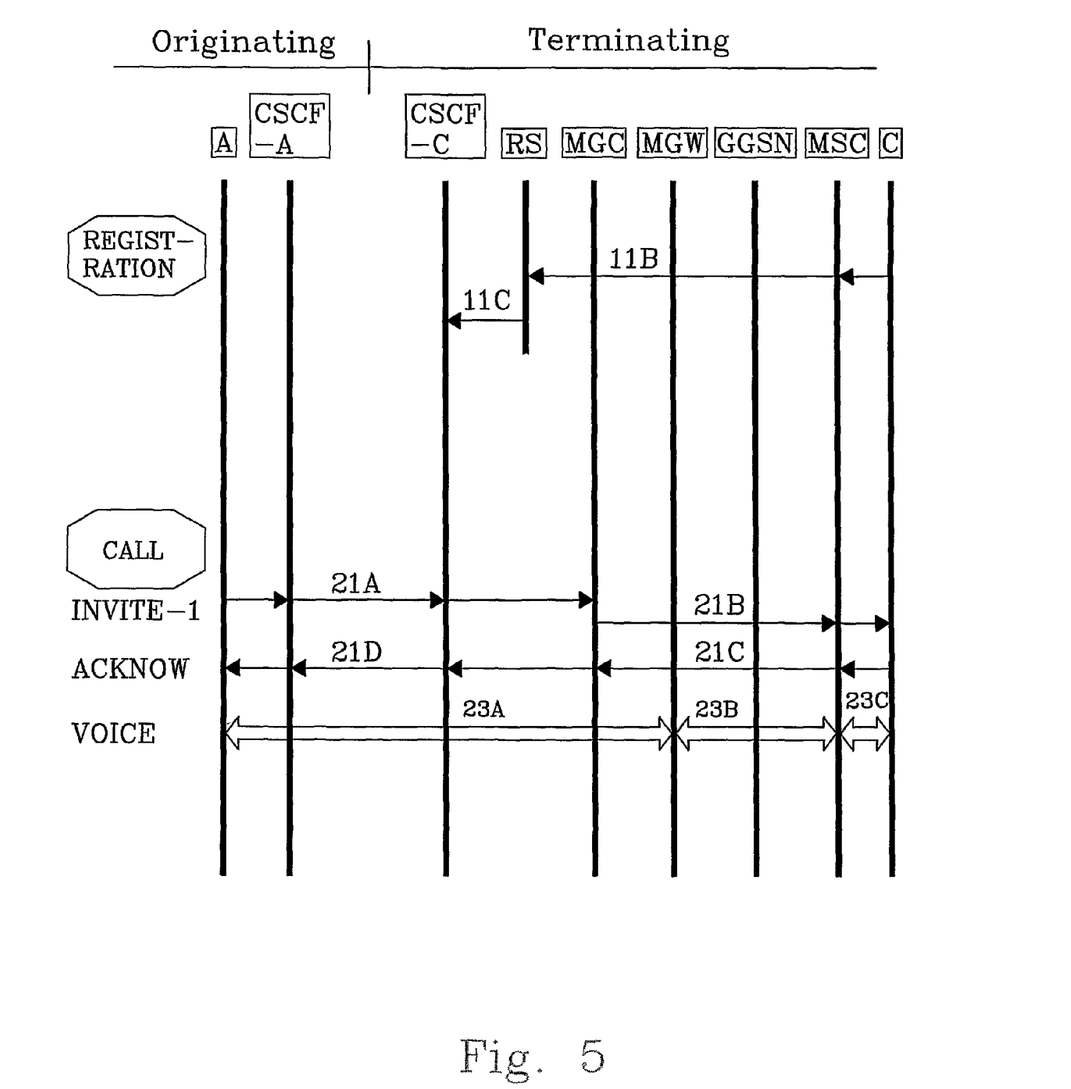
FIG. 5 discloses a signal sequence diagram for voice call setup from MMtel to PoC followed by routing into Circuit Switched domain.

The second embodiment of the invention will now be explained together with FIG. 5. The method disclosed in FIG. 5 comprises real-time voice call setup from A to C. The method will show routing of signaling into the CS domain and further setup of a voice. FIG. 5 is divided into two signaling groups i.e. REGISTRATION and CALL. The node entities such as CSCF, RS, etc. have already been explained in FIG. 2. The method according to the second embodiment of the invention comprises the following steps:

Registration

The C client, i.e. the PoC client, attaches the Circuit Switched CS network and a signal 11B is sent via the MSC from C to the Registration Surrogate node RS.

The RS registers the A client, i.e. the MMtel client. The registration is shown in the figure with a signal 11C. A contact Tag=MMtel, the first feature tag, is hereby stored in the CSCF-C as part of registration data for the C client.

Call

The A client initiates an MMtel voice session from the originating client A towards the terminating client C via CSCF-C, by sending a SIP INVITE request 21A. The CSCF-C finds the MMtel contact, i.e. the Tag=MMtel, for the PoC device and routes the SIP signaling request 21A accordingly to the MGC. The MGC maps SIP to ISUP. The MGC forwards the ISUP signaling request 21B via the MSC to the C client.

The C client responds with an acknowledgement by sending an acknowledge signal 21C via the MSC to the MGC. After conversion of 21C, a SIP 200 (OK) response signal 21D is sent from the MGC to the A client in accordance with FIG. 3.

A voice session is now established between the clients. The session consists of Real-Time Protocol RTP Voice 23A between the A client and the Media Gateway MGW, Pulse Code Modulation PCM Voice 23B between the MGW and the MSC and of Adaptive Multi Rate AMR Voice 23C between the MSC and the C client.

Figure 6:
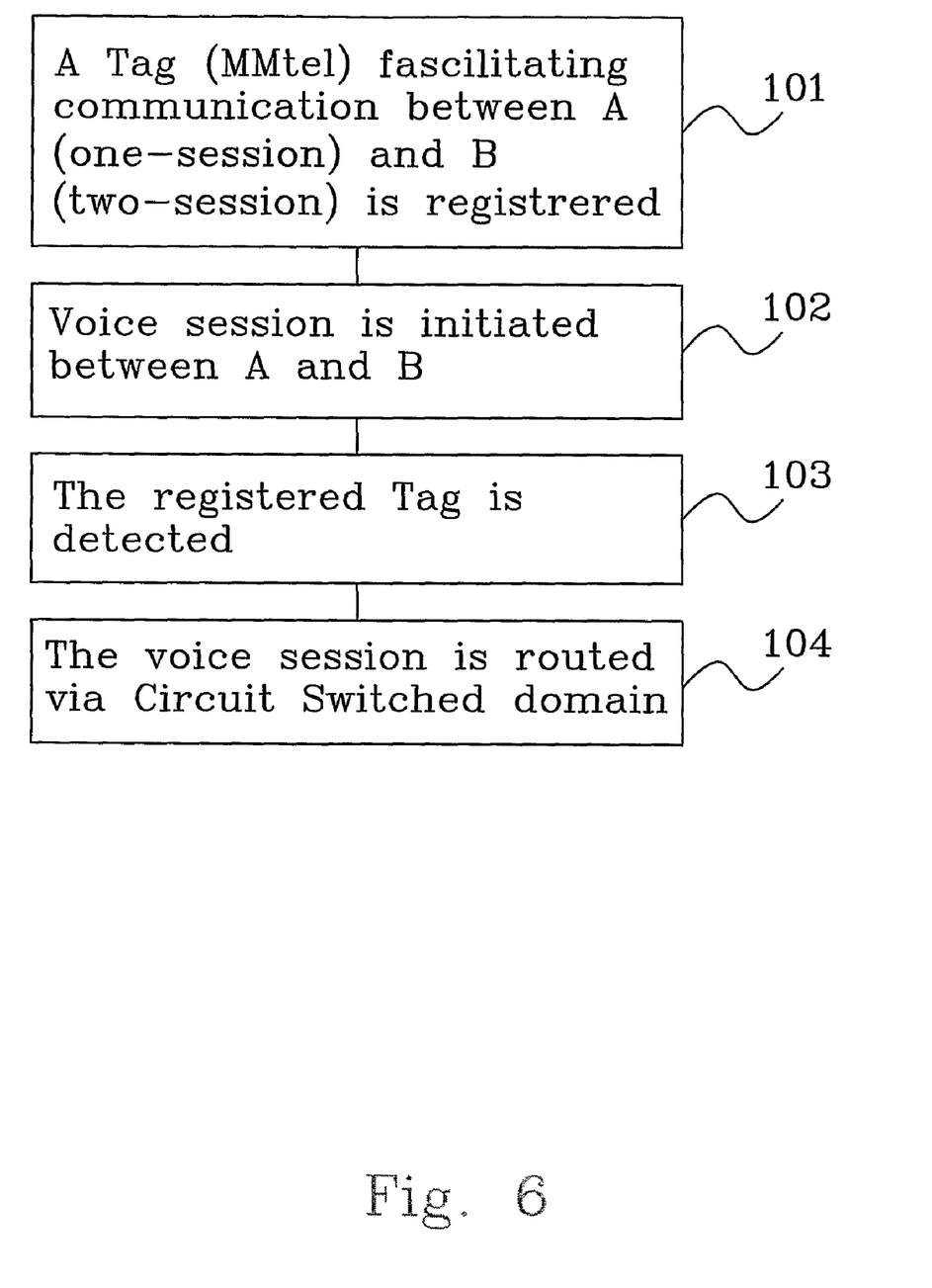
FIG. 6 discloses a flow chart illustrating some essential method steps of the invention.

FIG. 6 discloses a flowchart in which some important steps are shown. The flowchart is to be read together with the earlier shown figures. The flowchart comprises the following steps:

The first feature tag MMtel is stored in the CSCF that comprises registration data for the terminating user (B and C in the previous examples). This step is shown in FIG. 6 with a block 101.

A Voice session is initiated from the originating device to the terminating device. This step is shown in FIG. 6 with a block 102.

The first feature tag is detected in the CSCF during the voice session initiation. This step is shown in FIG. 6 with a block 103.

The voice session is routed via the Circuit Switched domain. This step is shown in FIG. 6 with a block 104.

Figure 7:
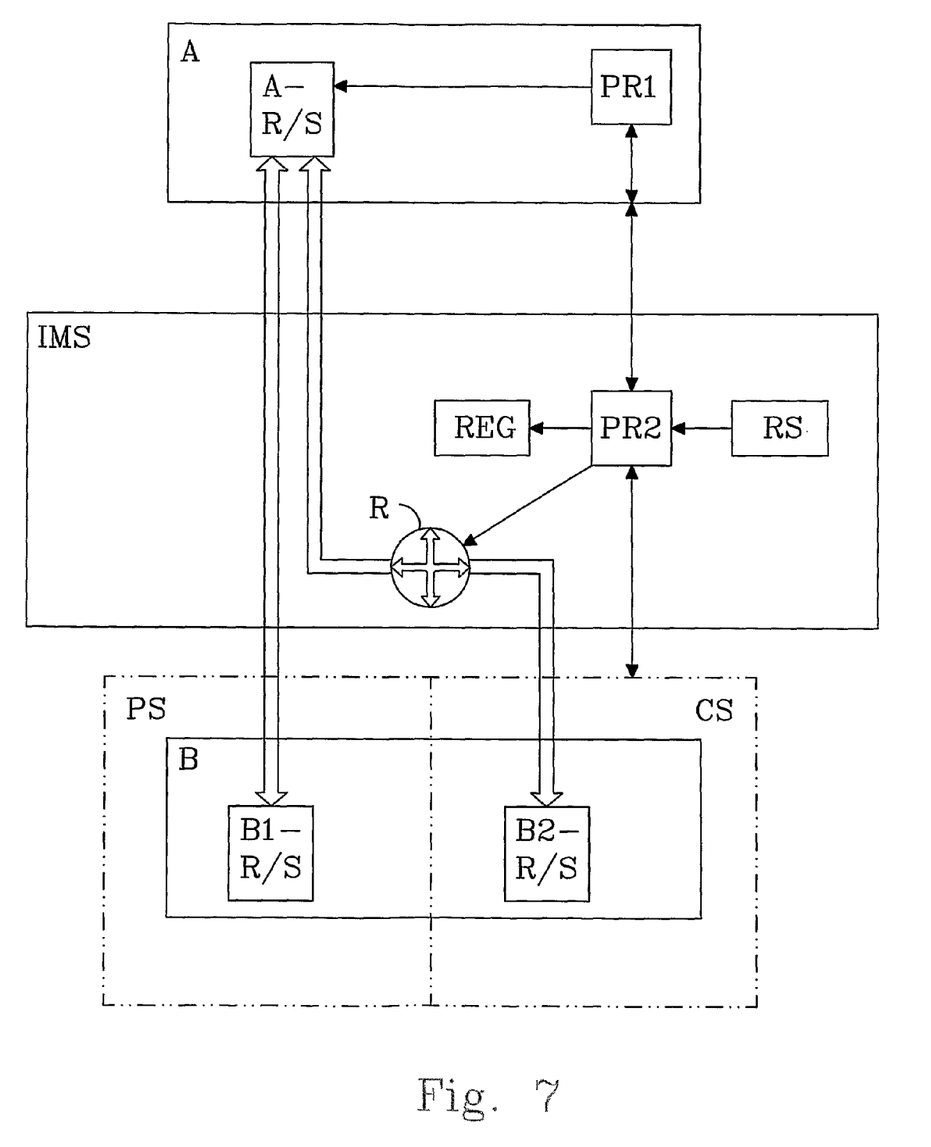
FIG. 7 schematically discloses an arrangement that can be used to put the invention into practice.

An arrangement that can be used to put the invention into practice is schematically shown in FIG. 7. FIG. 7 discloses a network IMS and user devices A and B (or C). User device A corresponds to the earlier described A client and user device B corresponds to the earlier described B client. The user device A comprises a processor unit PR1 that receives, handles and sends signals such as registration and media setup signals to IMS and B. PR1 includes capability to receive and respond to an option signal and reconfigure a receiver/sending device A-R/S to receive/send media according to the one-session or two-session model. A processor unit PR2 in the IMS network handles registration and media setup. A registration unit REG in the IMS network receives registration data from A, B or from a Registration Surrogate device RS via the processor unit PR2. The registration data is stored in REG. A routing device R is responsible for routing via the Circuit Switched domain CS. B operates in Packet Switched PS domain and Circuit Switched CS domain. B receives/sends media in PS domain via a Receiver/Sender B1-R/S and receives/sends media in CS domain via a Receiver/Sender B2-R/S.

In the figures enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above shown examples. Various kinds of networks types can be used by the invention such as PSTN, PLMN etc. The IMS configuration can, as already indicated, be of various kinds. To be noted is also that the tags (CSI and MMtel) mentioned in this document are to be seen as examples. Any feature tag could be used. The invention is of course not limited to the above described and in the drawings shown embodiments but can be modified within the scope of the enclosed claims.

The invention claimed is:

1. A method in a telecommunication system of facilitating communications between a first terminal A configured to use a first session model wherein two media sessions are negotiated and set up as one signaling session, and a second terminal B configured to use a second session model wherein two media sessions are set up in parallel as a first media session for voice and a second media session for video, said method comprising the steps of:

registering a first IP Multimedia Telephony (MMtel) feature tag in a Call/Session Control Function associated with the second terminal B (CSCF-B) in a control domain in the system, the first feature tag representing a contact between the first terminal A and the second terminal B;

initiating setup of the voice media session between the first and second terminals;

detecting the registered first MMtel feature tag, wherein the first MMtel feature tag indicates that the voice media session must be routed through a circuit-switched domain for the terminals to be able to communicate; and routing the voice media session via the circuit-switched domain.

2. The method according to claim 1, wherein the registering step includes registering the first MMtel feature tag either statically or dynamically via a Surrogate Register (RS).

3. The method according to claim 2, wherein the registering step includes registering the first MMtel feature tag statically by manual input to the Surrogate Register (RS).

4. The method according to claim 2, wherein the registering step includes registering the first MMtel feature tag dynamically by input of the first MMtel feature tag to the Surrogate Register (RS) when the second terminal B enters into the system.

5. The method according to claim 4, wherein the registering step includes registering the first feature tag dynamically by implementing CAMEL triggers or Open Services Architecture (OSA)/Parlay/Parlay X Status Services.

6. The method according to claim 1, wherein the registering step includes registering the first MMtel feature tag in the Call/Session Control Function associated with the second terminal B (CSCF-B) in which user data for the second terminal B is stored.

7. The method according to claim 1, further comprising the steps of:

registering a second feature tag in the control domain in the system, wherein the second feature tag is a Combined Circuit-Switched and IP Multimedia Subsystem (CSI) and MMtel feature tag representing a contact between the first terminal A and the second terminal B;

initiating from the first terminal, a service capability check;

receiving by the first terminal A, CSI capability features related to the second terminal B;

determining that the second terminal B is configured to use the second session model; and reconfiguring the first terminal A for usage of the second session model.

8. The method according to claim 7, further comprising initiating setup of the video media session in a packet-switched domain between the first terminal A and the second terminal B in parallel with the voice session.

9. The method according to claim 7, wherein the registering step includes registering the second CSI&MMtel feature tag in a Call/Session Control Function associated with the first terminal A (CSCF-A) in which user data for the first terminal A is stored.

10. A method in a telecommunication system of facilitating communications between a first terminal A configured to use a first session model wherein two media sessions are negotiated and set up as one signaling session, and a second terminal B configured to use a second session model wherein two media sessions are set up in parallel as a first media session for voice and a second media session for video, said method comprising the steps of:

registering in a Call/Session Control Function (CSCF), a first IP Multimedia Telephony (MMtel) feature tag, representing a contact between the first terminal A and the second terminal B;

receiving in the CSCF, an initiation of set up of the voice media session between the terminals;

detecting in the CSCF, the registered first MMtel feature tag, wherein the first MMtel feature tag indicates that the voice media session must be routed through a circuit-switched domain for the terminals to be able to communicate; and routing the voice media session via the circuit-switched domain.

11. An arrangement in a telecommunication system for facilitating communications between a first terminal A configured to use a first session model wherein two media sessions are negotiated and set up as one signaling session, and a second terminal B configured to use a second session model wherein two media sessions are set up in parallel as a first media session for voice and a second media session for video, said arrangement comprising:

means for registering a first IP Multimedia Telephony (MMtel) feature tag in a Call/Session Control Function associated with the second terminal B (CSCF-B) in a control domain in the system, the first MMtel feature tag representing a contact between the first terminal A and the second terminal B;

means for receiving setup of the voice media session between the terminals;

means for detecting the registered first MMtel feature tag, wherein the first MMtel feature tag indicates that the voice media session must be routed through a circuit-switched domain for the terminals to be able to communicate; and means for routing the voice media session via the circuit-switched domain.

12. The arrangement according to claim 11, further comprising means for registering the first MMtel feature tag either statically or dynamically via a Surrogate Register (RS).

13. The arrangement according to claim 12, comprising means for registering the first MMtel feature tag statically by manual input to the Surrogate Register (RS).

14. The arrangement according to claim 12, comprising means for registering the first MMtel feature tag dynamically by inputting the first MMtel feature tag to the Surrogate Register (RS) when the second terminal B enters into the system.

15. The arrangement according to claim 11, further comprising:

means for registering a second feature tag in the control domain, wherein the second feature tag is a Combined Circuit-Switched and IP Multimedia Subsystem (CSI) and MMtel feature tag representing a contact between the first terminal A and the second terminal B;

means for receiving by the first terminal, CSI capability features related to the second terminal B; and means for reconfiguring the first terminal A for usage of the second session model.

16. The arrangement according to claim 15, further comprising means for initiating setup of the video media session in a packet-switched domain between the terminals, in parallel with the voice session.

17. An arrangement in a telecommunication system for facilitating communications between a first terminal A configured to use a first session model wherein two media sessions are negotiated and set up as one signaling session, and a second terminal B configured to use a second session model wherein two media sessions are set up in parallel as a first media session for voice and a second media session for video, said arrangement comprising:

means for registering in a Call/Session Control Function (CSCF), a first IP Multimedia Telephony (MMtel) feature tag representing a contact between the first terminal A and the second terminal B;

means for receiving in the CSCF, an initiation of set up of the voice media session between the terminals;

means for detecting in the CSCF, the registered first MMtel feature tag, wherein the first MMtel feature tag indicates that the voice media session must be routed through a circuit-switched domain for the terminals to be able to communicate; and means for routing the voice media session via the circuit-switched domain.

18. A system in a telecommunication network for facilitating communications between a first terminal A configured to use a first session model wherein two media sessions are negotiated and set up as one signaling session, and a second terminal B configured to use a second session model wherein two media sessions are set up in parallel for media transportation as a first media session for voice and a second media session for video, said system comprising:

means for registering in Call/Session Control Functions in a control domain in the system, mutual communication possibilities between the first terminal A and the second terminal B;

means for initiating setup of the voice media session between the first terminal A and the second terminal B;

means for routing the voice media session via a circuit-switched domain;

means for receiving in the first terminal A, capability features related to the second terminal B;

means for reconfiguring the first terminal A for usage of the second session model; and means for initiating setup of the video media session between the terminals in parallel with the voice session.

19. A device in a telecommunication system for facilitating communications between a first terminal A configured to use a first session model wherein two media sessions are negotiated and set up as one signaling session, and a second terminal B configured to use a second session model wherein two media sessions are set up in parallel for media transportation as a first media session for voice and a second media session for video, said device comprising:

a control processor; and computer readable program code which, when run on the processor, causes the processor to perform the steps of:

registering a first IP Multimedia Telephony (MMtel) feature tag in a Call/Session Control Function associated with the second terminal B (CSCF-B) in a control domain in the system, the first MMtel feature tag representing a contact between the first terminal A and the second terminal B;

initiating setup of the voice media session between the terminals;

detecting the registered first MMtel feature tag, wherein the first MMtel feature tag indicates that the voice media session must be routed through a circuit-switched domain for the terminals to be able to communicate; and routing the voice media session via the circuit-switched domain.

* * * * *

UNITED STATES PATENT AND TRADEMARK OFFICE
CERTIFICATE OF CORRECTION

PATENT NO. : 7,912,042 B2
APPLICATION NO. : 12/444937
DATED : March 22, 2011
INVENTOR(S) : Falkena et al.

It is certified that error appears in the above-identified patent and that said Letters Patent is hereby corrected as shown below:

On the Face Page, in Field (58), under "Field of Classification Search", in Column 1, Line 1, before "709/229", insert -- 370/352, 357, 354, 328 --.

On the Face Page, in Field (56), under "OTHER PUBLICATIONS", in Column 2, Line 1, delete "WGZ" and insert -- WG2 --, therefor.

On the Face Page, in Field (56), under "OTHER PUBLICATIONS", in Column 2, Lines 8-9, delete "/tsg-sa/WG2-Arch/" and insert -- /tsg_sa/WG2_Arch/ --, therefor.

Signed and Sealed this
Fifteenth Day of November, 2011

David J. Kappos
*Director of the United States Patent and Trademark Office*